United States Patent
Desai

(10) Patent No.: US 9,732,709 B2
(45) Date of Patent: Aug. 15, 2017

(54) METHOD AND APPARATUS FOR CONTROLLING THE STARTING OF AN INTERNAL COMBUSTION ENGINE

(71) Applicant: Perkins Engines Company Limited, Cambridgeshire (GB)

(72) Inventor: Paresh Rameshchandra Desai, Cambridgeshire (GB)

(73) Assignee: Perkins Engines Company Limited, Peterborough (GB)

( * ) Notice: Subject to any disclaimer, the term of this patent is extended or adjusted under 35 U.S.C. 154(b) by 340 days.

(21) Appl. No.: 14/397,444

(22) PCT Filed: May 21, 2013

(86) PCT No.: PCT/GB2013/051326
§ 371 (c)(1),
(2) Date: Oct. 27, 2014

(87) PCT Pub. No.: WO2013/175198
PCT Pub. Date: Nov. 28, 2013

(65) Prior Publication Data
US 2015/0083093 A1 Mar. 26, 2015

(30) Foreign Application Priority Data
May 21, 2012 (GB) .................................. 1208911.6

(51) Int. Cl.
*F02M 31/04* (2006.01)
*F02D 41/00* (2006.01)
(Continued)

(52) U.S. Cl.
CPC ........... *F02M 31/042* (2013.01); *F02B 37/00* (2013.01); *F02D 41/0055* (2013.01);
(Continued)

(58) Field of Classification Search
CPC ...... F02M 31/042; F02M 31/06; F02M 31/08; F02M 26/00; F02M 26/02; F02M 26/03;
(Continued)

(56) References Cited

U.S. PATENT DOCUMENTS

| 3,046,005 A | 8/1962 | Egil et al. |
| 3,927,523 A | 12/1975 | Shioyama et al. |

(Continued)

FOREIGN PATENT DOCUMENTS

| CN | 101360896 | 2/2009 |
| CN | 101363348 | 2/2009 |

(Continued)

OTHER PUBLICATIONS

Machine translation of Detailed Description for Hashimoto et al. (DE10306586A1), received from https://worldwide.espacenet.com/, pp. 1-14.*

(Continued)

*Primary Examiner* — Grant Moubry
(74) *Attorney, Agent, or Firm* — Leydig, Voit & Mayer, Ltd.

(57) ABSTRACT

Starting an internal combustion engine may be difficult as a consequence of the operating conditions of the engine. Even after the engine has started, it may take a long period of time for the engine to reach operating temperatures. In the present disclosure, starting difficulty is expected for an engine with an exhaust gas recirculation system, before starting the engine an exhaust gas aftertreatment device is heated to warm residual air within the exhaust gas system.

15 Claims, 5 Drawing Sheets

(51) Int. Cl.
*F02D 41/06* (2006.01)
*F02B 37/00* (2006.01)
*F02N 19/02* (2010.01)

(52) U.S. Cl.
CPC ........ *F02D 41/064* (2013.01); *F02D 41/0007* (2013.01); *F02D 2200/023* (2013.01); *F02D 2200/703* (2013.01); *F02N 19/02* (2013.01); *Y02T 10/47* (2013.01)

(58) Field of Classification Search
CPC ........ F02M 26/04; F02M 26/33; F02M 26/30; F02M 26/35; F02M 27/00; F02M 2026/001; F02D 41/0007; F02D 41/0055; F02D 41/064; F02D 41/06; F02D 41/062; F02D 41/0047; F02D 2200/023; F02D 2200/703; F02D 45/00; F02N 19/02; Y02T 10/47
USPC ........ 123/543, 549, 550, 556, 559.1, 568.11, 123/568.21, 179.21
See application file for complete search history.

(56) References Cited

U.S. PATENT DOCUMENTS

| | | | |
|---|---|---|---|
| 5,379,592 A | 1/1995 | Waschkuttis | |
| 5,704,323 A | 1/1998 | Gardell et al. | |
| 6,591,818 B2 * | 7/2003 | Sasaki | F01N 3/2006 123/568.12 |
| 7,261,086 B2 * | 8/2007 | Nuang | F01N 3/00 123/436 |
| 7,426,922 B2 | 9/2008 | Shimo et al. | |
| 2011/0270511 A1 | 11/2011 | Kurtz | |

FOREIGN PATENT DOCUMENTS

| | | |
|---|---|---|
| DE | 4025565 A1 | 2/1992 |
| DE | 10306586 A1 | 9/2003 |
| EP | 1229240 A2 | 8/2002 |
| JP | 200307134 | 10/2003 |
| JP | 2008255940 | 10/2008 |
| JP | 2010180711 | 8/2010 |
| JP | 2011-185244 A | 9/2011 |
| JP | 2011-220171 A | 11/2011 |
| RU | 2442013 | 2/2012 |
| WO | WO 2007/030906 A2 | 3/2007 |

OTHER PUBLICATIONS

European Patent Office, International Search Report in International Patent Application No. PCT/GB2013/051326, Oct. 17, 2013, 3 pp.
United Kingdom Intellectual Property Office, Search Report in United Kingdom Patent Application No. GB1208911.6, Sep. 17, 2012, 2 pp.

* cited by examiner

METHOD AND APPARATUS FOR CONTROLLING THE STARTING OF AN INTERNAL COMBUSTION ENGINE

TECHNICAL FIELD

This disclosure relates to methods and apparatuses for controlling the starting of an internal combustion engine.

BACKGROUND

Starting an internal combustion engine in low ambient air temperatures, for example below 0° C., is often difficult without the use of starting aids, such as glow plugs. When cold air is drawn into the cylinder of a cold engine, piston velocity needs to be high in order to raise the temperature at top dead centre of the piston cycle and help the fuel in the cylinder to ignite. This is particularly true for diesel engines. However, the piston velocity when starting the engine is dependent on the starter motor alone, which is in turn powered by batteries. Consequently, the starter motor often does not produce a high enough piston velocity to start the engine and the battery may be drained before the engine is able to fire.

Thus, in low ambient air temperatures it is sometimes not possible to start an internal combustion engine, and even when the engine will start, it may take a considerable amount of time to warm up the engine to operating temperatures.

Similar problems may occur at high altitude where the concentration of oxygen in the air is lower than at sea level, and where the ambient air temperature is also low the problems may be even more severe.

The problem may be even more exacerbated if there are any parasitic loads on the engine. For example, if a diesel engine is fitted in a machine, such as a construction or agricultural type machine, the machine may make use of an implement or boom that uses hydraulics to function. Hydraulics require a hydraulic pump to be running, which adds a parasitic load on the engine as the engine starts.

U.S. Pat. No. 7,426,922 describes an engine exhaust gas purifier with an exhaust gas recirculation system (EGR). There are two EGR passages, the first recirculating exhaust gases from downstream of a diesel oxidation catalyst (DOC) and diesel particulate filter (DPF) to a point upstream of the air intake passage to the engine, and the second recirculating exhaust gases from upstream of the DOC and DPF to the point upstream of the air intake passage. Each passage has a throttle valve which may control the volume of gas which passes through the passage. An EGR cooler is also provided partway in the first EGR passage.

The temperature of the air at the intake of the engine is controlled by controlling the throttle valves in the first and second EGR passages to regulate the amount of EGR gas which flows through the cooler in the second EGR passage. The throttle valves are controlled to maintain the air intake temperature within a particular target band, which is predetermined to maintain the DOC and DPF at an efficient operating temperature. The target temperatures tend to decrease as engine loads increase.

Because this system attempts to control the temperature of the DOC and DPF only by passing a proportion of the EGR gas through a cooler before entering the air intake stream of the engine, it cannot heat the DOC and DPF any more rapidly than by passing 100% of the EGR gases through the second EGR passage, where the gases will not be cooled. Therefore, it cannot improve the cold starting of an engine, or more rapidly bringing an engine up to operating temperatures, compared with an engine which has a single EGR passage which is not cooled.

SUMMARY

The disclosure provides: a method for starting an internal combustion engine which has an exhaust system comprising an exhaust gas path, an exhaust gas aftertreatment device which is in the exhaust gas path, and an exhaust gas recirculation path such that, when the engine is turned on, exhaust gas may exit the engine into the exhaust gas path and at least part of the exhaust gas which has passed through the aftertreatment device may be recirculated to the engine air intake via the exhaust gas recirculation path, the method comprising the steps of: when engine start is demanded, determining from one or more measured parameters whether engine start difficulty is expected; if engine start difficulty is expected, heating the exhaust gas aftertreatment device before starting the engine so that residual air within the exhaust gas system is warmed by the exhaust gas aftertreatment device; and starting the engine.

The disclosure also provides: a controller to control the starting of an internal combustion engine which has an exhaust system comprising an exhaust gas path, an exhaust gas aftertreatment device which is in the exhaust gas path, and an exhaust gas recirculation path such that, when the engine is turned on, exhaust gas may exit the engine into the exhaust path and at least part of the exhaust gas which has passed through the aftertreatment device may be recirculated to the engine air intake via the exhaust gas recirculation path, the controller being configured to: when engine start is demanded, determine from one or more measured parameters whether engine start difficulty is expected; if engine start difficulty is expected, turn on heating of the exhaust gas aftertreatment device before starting the engine, so that residual air within the exhaust gas system is warmed by the exhaust gas aftertreatment device; and start the engine.

DETAILED DESCRIPTION

Figure 1:
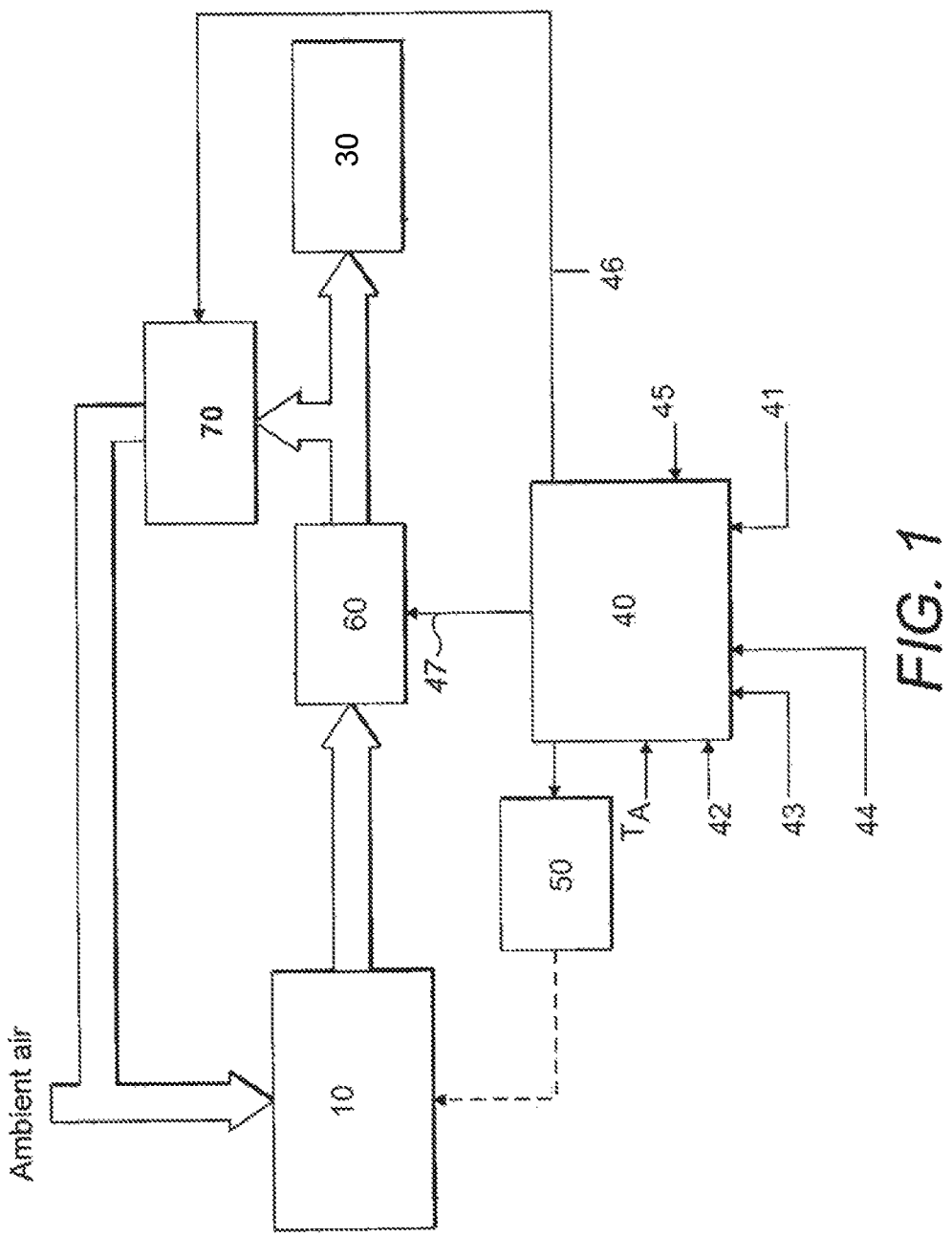
FIG. 1 shows a schematic drawing of an internal combustion engine with a particulate filter and an exhaust gas recirculation path.

FIG. 1 shows an arrangement of an internal combustion engine 10, which could be a diesel engine or a petrol/gasoline engine. An exhaust gas aftertreatment device 60, such as a particulate filter 60, may be located in the exhaust gas path, downstream of the exhaust manifold of the engine 10, such that when the engine is started, exhaust gases in the exhaust path may pass through the particulate filter 60. The particulate filter 60 might include, but is not limited to, at least one of a diesel oxidation catalyst, a diesel particular filter or a selective catalytic reduction (SCR) system. The choice of particulate filter may depend upon, for example, which exhaust gas emissions are desired to be reduced before the exhaust gas is released into the atmosphere and/or the engine 10 type.

The exhaust gases downstream of the particulate filter 60 may continue through the exhaust gas path to downstream components 30, for example further particulate filters, or be vented directly to the atmosphere, or be at least in part recirculated via an exhaust gas recirculation path into the air intake manifold of the engine 10. A recirculation valve 70 may be located in the recirculation path and when it is open, the recirculation path may be open to allow exhaust gases to be recirculated. When the recirculation valve 70 is closed, the recirculation path may be closed and exhaust gases may not be recirculated.

The particulate filter 60 may be arranged such that it may be heated before and/or during the operation of the engine 10. The particulate filter 60 may be heated by a number of different methods, which may include, but are not limited to, electric heating and combustion heating.

Electric heating may be performed when electric wires are arranged within and/or around the particulate filter 60. For example, thin conducting wires may be embedded within the honeycomb structure of a catalyst in the particulate filter 60, and when electric current is passed through the wires, the catalyst may be heated.

Combustion heating may be performed by injecting fuel directly into the filter 60, and igniting it with a spark plug. Alternatively, fuel may be injected into the exhaust stream at a point upstream of the filter 60 and be ignited by a spark plug either within or upstream of the filter 60. Furthermore, if filter 60 heating is still required after starting the engine 10, unburned engine fuel may enter the exhaust gas stream directly from the engine exhaust as a consequence of running a rich fuel-air ratio in the engine 10, and be ignited by a spark plug either within or upstream of the filter 60.

Control of the recirculation valve 70 and the heating of the particulate filter 60 may be performed by a controller 40. The controller 40 may also control the operation of a starter motor 50, which may operate to start the engine 10.

Figure 2:
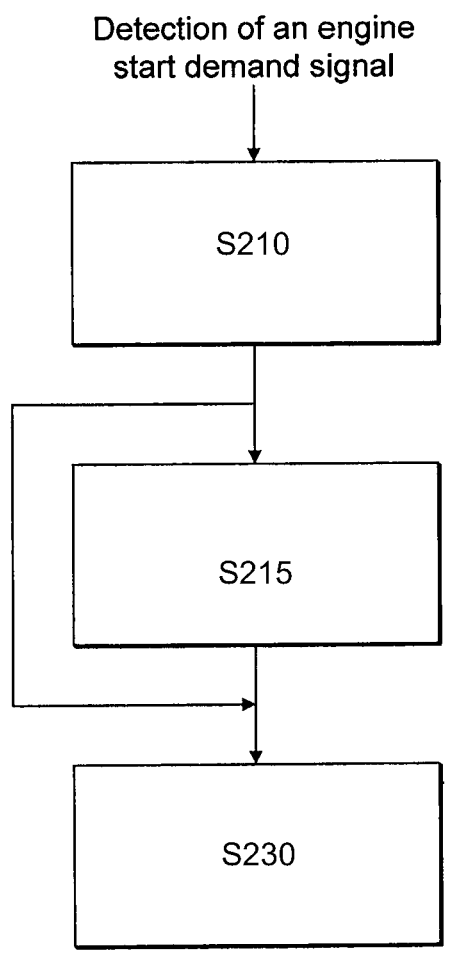
FIG. 2 shows method steps for starting an engine arrangement of the type shown in FIG. 1.

FIG. 2 shows a flow diagram of a method of controlling the starting of the engine 10 in accordance with a mode of the present disclosure.

The method of starting the engine 10 is triggered by an engine start demand signal 45. The engine start demand signal 45 may be triggered, for example, by the turning of a key in the ignition of a vehicle by an operator, the pressing of a starter button by the operator, or by some other means which will be immediately apparent to the skilled person.

Upon detection of an engine start demand signal 45, the controller 40 initiates the engine start control method shown in FIG. 2. The first step S210 of the method is to consider if a measured parameter(s) indicates that engine start difficulty is to be expected.

The measured parameter(s) may include, but is not limited to, at least one of ambient air temperature $T_A$, engine coolant temperature 41, altitude 42, and fuel temperature 44.

The above mentioned measured parameter(s) may be determined by direct or indirect measurement techniques. For example, a measurement of altitude 42 may be obtained directly using an altimeter, or some other suitable direct measurement device, or may be derived from other sensor measurements, using for example mathematical models.

Likewise, there are many different ways in which a measure of the ambient air temperature $T_A$, the engine coolant temperature 41 and the fuel temperature 44 may be obtained. For example, one technique for obtaining a measure of ambient air temperature $T_A$ may be to take a direct measurement of the air temperature using a temperature sensor. The temperature sensor may be located anywhere on or near the engine 10 where ambient or near ambient air is present, for example at the air intake manifold of the engine, or at some other suitable location either within, or on the exterior of, the engine 10. In addition to, or as an alternative to, a direct measurement of the ambient air temperature $T_A$, an indirect measurement may be taken. Indirect measurements of ambient air temperature $T_A$ might include, but are not limited to, a direct measurement of the engine coolant temperature 41 or fuel temperature 44, from which an approximation of ambient air temperature $T_A$ may be derived. The engine coolant temperature 41 and fuel temperature 44 may be obtained in analogous direct or indirect ways, which will be immediately apparent to the skilled person.

The measured parameter(s) may be used as an input to a control map or table which determines which method step in starting the engine 10 should be undertaken next.

As shown in FIG. 2, if the measured parameter(s) is such that, according to the control map, engine start difficulties are expected, the engine start method will proceed to step S215. If, on the other hand, the measured parameter(s) is such that, according to the control map, engine start difficulties are not to be expected, the engine start method will proceed directly to step S230.

For example, the control map may compare the ambient air temperature $T_A$ to a threshold temperature $T_{TH}$. If the ambient air temperature $T_A$ is greater than the threshold temperature $T_{TH}$, the engine should start normally without any problems and, therefore, the method may proceed directly to Step S230. If, however, the ambient air temperature $T_A$ is less than the threshold temperature $T_{TH}$, engine start difficulties should be expected and the method may proceed instead to Step S215.

The threshold temperature $T_{TH}$ may be a predetermined, fixed value, for example 0° C. or 5° C., or it may depend upon one or many of the other measured parameters. For example, at higher altitudes, the threshold temperature $T_{TH}$ may be lowered.

In addition to one or many of the measured parameter inputs, the control map/table may also consider a number of other factors including, but not limited to, at least one of, parasitic loads on the engine, engine size and engine fuel type.

In step S215, particulate filter 60 heating is turned on and the recirculation valve 70 is opened. The recirculation valve 70 may be opened before, at the same time as or after the particulate filter 60 heating is turned on. By heating the particulate filter 60 and opening the recirculation valve 70 before turning on the engine 10, residual air in the particulate filter 60, the exhaust gas path and the exhaust gas recirculation path may be heated by the particulate filter 60.

When the particulate filter 60 has reached a reasonable temperature, and has been maintained at that temperature for a sufficient period of time for the residual air to have reached a desired temperature, the engine may be started (Step S320) by, for example, turning on the starter motor 50, or by any other means which will be known to the person skilled in the art. In any event, the engine 10 may be started after a predetermined extended period of time, even if the filter 60 has not reached a reasonable temperature, or the residual air has not reached the desired temperature, for self-protection of the arrangement. The predetermined extended period of time may be dependent upon the physical arrangement of the engine, as well as the measured engine parameters, but it may, for example, be 600 seconds after starting the filter 60 heating.

The minimum temperature to which the particulate filter 60 should be heated might be determined by the physical arrangement of the components of the system relative to one another and/or at least one of the measured engine parameters. For example, at sea level and at an ambient temperature of 5° C., the minimum target particulate filter temperature might be set to be somewhere between 350° C. and 500° C., such as 400° C.

Lower ambient air temperatures $T_A$ and/or lower engine temperatures and/or higher altitudes 42 may require the particulate filter 60 to be heated to a higher temperature. A map or table of target particulate filter temperature and ambient air temperature $T_A$ might, for example, be used for this purpose.

Having reached the minimum temperature, the particulate filter 60 may be held at that temperature until the residual air has reached the desired temperature. The desired temperature may depend upon the physical arrangement of the engine assembly itself, as well as, for example, the ambient air temperature $T_A$ and altitude. The temperature of the residual air may be determined by either direct or indirect measurement, using techniques well known to the person skilled in the art. Alternatively, the residual air may be deemed to have reached the desired temperature after the particulate filter has been held above the target temperature for a period of time. The period of time may depend upon the physical arrangement of the engine assembly itself, as well as, for example, the ambient air temperature $T_A$ and altitude, or may be a fixed value, for example at least 100 seconds.

Where the particulate filter 60 is heated by conductive wires, the temperature to which the particulate filter 60 is heated may be controlled by passing an electric current through the wires for only a certain period of time. For example, a control map may determine the electric heating time from at least one of the measured parameters which are input to the map. In addition to this, or as an alternative, the temperature of the particulate filter 60 may be monitored, and heating of the filter 60 turned off once the filter 60 has reached the desired temperature.

Where the particulate filter 60 is heated by combustion of fuel, the temperature to which the particulate filter 60 is heated may be controlled by adjusting the volume of fuel injected into, or upstream of, the particulate filter 60, or, when heating of the filter 60 is still desired after turning on the engine 10, by adjusting the amount of fuel injected into the engine 10, which may alter the amount of unburned fuel entering the exhaust gas stream from the engine exhaust gas manifold. For injection of fuel into, or upstream of, the filter 60, the fuel may be injected and then combusted in a single injection and combustion event, or may be injected in multiple smaller injection and combustion events. In the case of the latter, the temperature of the particulate filter 60 may be controlled by adjusting the number of injection and combustion events. Compared with a single, larger injection and combustion event, multiple injection and combustion events may decrease the chance that fuel will be left unburned or ignite downstream of the filter 60. The volume of fuel injected and/or the number of injection and combustion events may be determined by the measured parameters. For example, a control map may also determine the fuel injection volume and/or number of injection and combustion events from at least one of the measured parameters which are input to the map. In addition to this, or as an alternative, the temperature of the particulate filter 60 may be monitored, and combustion of the fuel within or upstream of the filter 60 ceased after the filter 60 has reached the desired temperature.

At the time the engine is turned on, the air recirculated to the air intake manifold of the engine 10 will already be warmer than if only ambient air were to be drawn into the air intake manifold of the engine 10.

Some time after starting the engine 10, the recirculation valve 70 may be closed to prevent recirculation of warmed exhaust gases and particulate filter 60 heating turned off so that the engine 10 is returned to normal running. The closing of the recirculation valve 70 and turning off of the particulate filter 60 heating may take place at a time when the engine 10 is considered to be operating within an acceptable operating range. For example, the engine 10 may be considered to be operating within an acceptable operating range when the engine exceeds a performance threshold, for example the engine temperature exceeds a threshold value, such as 40° C. or 45° C., or the engine speed exceeds a threshold value, such as 300 rev/min. In any event, the engine 10 may be returned to normal operating conditions upon expiry of a predetermined extended period of time (which is explained above), even if the engine temperature or speed have not reached the threshold values, for self-protection of the arrangement.

Turning off of the filter 60 heating and closing of the recirculation valve 70 may take place at the same time, or different times, and may be triggered by different engine temperature and/or speed thresholds.

The engine temperature may be measured using one of the many direct or indirect measurement techniques which will be well known to the skilled person. For example, the engine coolant temperature 41 may be considered to give a measurement of the engine temperature.

Figure 3:
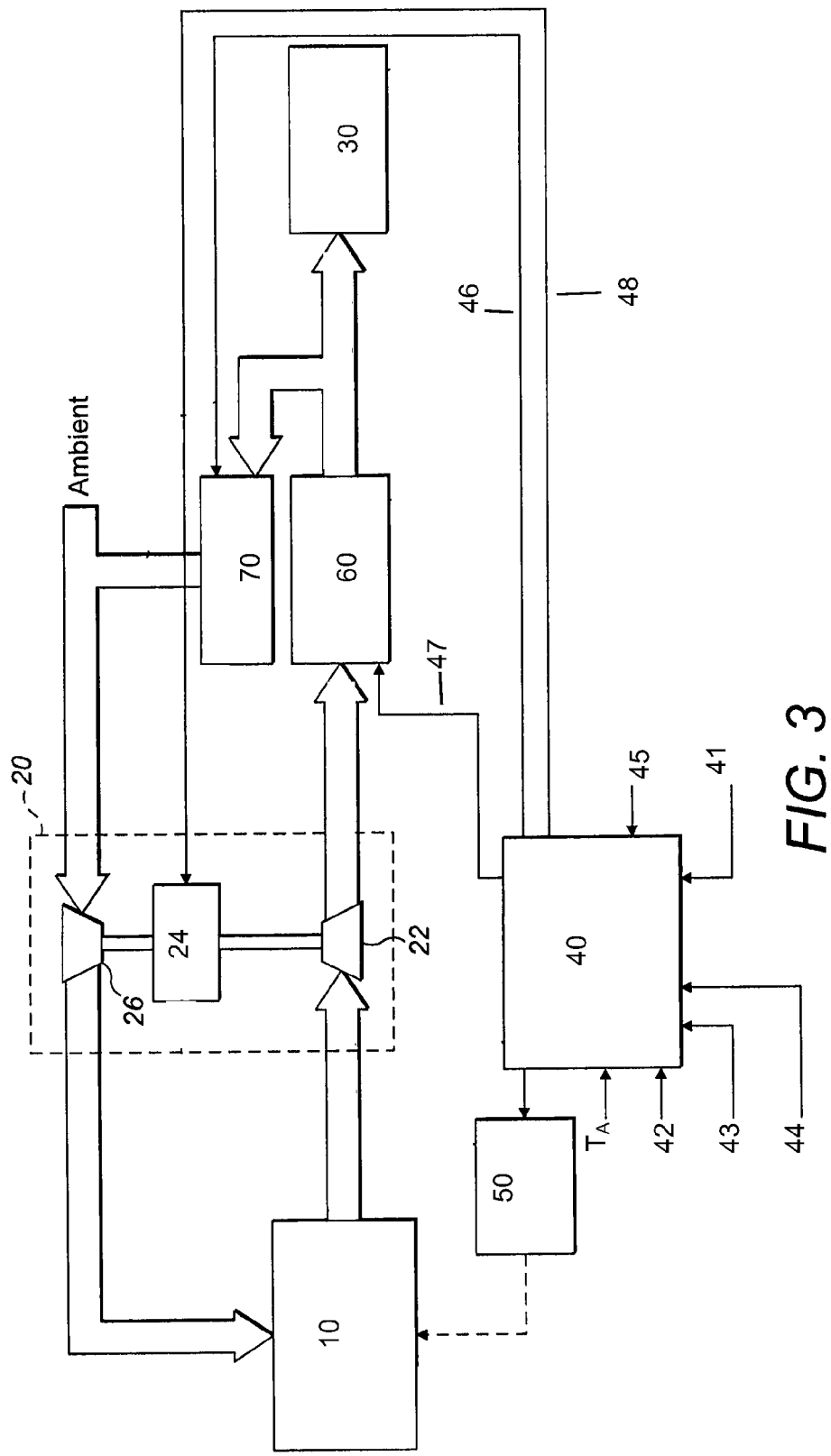
FIG. 3 shows a schematic drawing of a turbocharged internal combustion engine with an electrically assisted turbocharger and a particulate filter and exhaust gas recirculation path.

FIG. 3 shows a modification of the engine arrangement shown in FIG. 1. In FIG. 3, the engine arrangement is a turbocharged internal combustion engine.

In a standard turbocharger arrangement, a compressor in the turbocharger may operate to increase the pressure of the air entering the air intake manifold of an engine above atmospheric pressure by an amount often described as 'boost pressure'. The turbine and compressor may be attached to different ends of a turbocharger shaft, such that when exhaust gas passes through the turbine, the shaft may be turned, which may turn the compressor which increases the pressure of the air entering the air intake manifold of the engine.

Turbochargers with an electro turbo assist (ETA) device operate on the same principles as standard turbochargers, but are modified to include the ETA which may have an energy storage device, for example a fly wheel or battery, and which may be coupled to the turbocharger shaft.

When the shaft is turning, energy may be input to the energy storage device. When the shaft is not turning, or is turning too slowly to achieve the desired air intake pressure, energy may be output from the energy storage device and used to turn the shaft in order to turn the compressor. For example, if the energy storage device is a battery, the ETA generator/motor may comprise coiled windings around the shaft. When the shaft rotates, the electromagnetic forces created in the windings may generate electricity to be stored in the battery. When the shaft is not being turned by the turbine (for example when the engine is not turned on), or when the shaft is being turned too slowly, electrical energy may be supplied from the battery to the windings so that the windings may act as a motor and turn the shaft.

The turbocharger 20 in the arrangement shown in FIG. 1 has an electro turbo assist (ETA) device 24. The turbine 22 intake of the turbocharger 20 may be located downstream of the exhaust manifold of the engine 10 such that when the engine 10 is running, exhaust gases may pass through the turbine 22 of the turbocharger 20. The compressor 26 intake of the turbocharger 20 may be located upstream of the engine air intake manifold such that intake air may be compressed before it enters the intake manifold of the engine 10.

The particulate filter 60 may be located at some point either upstream or downstream of the turbine 22 of the turbocharger 20, for example downstream of the turbine 22, as shown in FIG. 3, so that when the engine 10 is running, exhaust gases downstream of the turbocharger turbine 22 may pass to the particulate filter 60.

Air drawn into the intake of the turbocharger compressor 26 may come directly from the atmosphere, or via the exhaust gas recirculation path, or a combination of the two, as shown in FIG. 3. Exhaust gas recirculated to the turbocharger compressor 26 intake whilst the engine 10 is running may be drawn from a point downstream of the particulate filter 60, and the exhaust gases might be recirculated directly to the air intake manifold of the engine 10 or via the turbocharger compressor 26, as shown in FIG. 3, or a combination of the two.

Control of the ETA device 24 operation may be performed by the controller 40.

Figure 4:
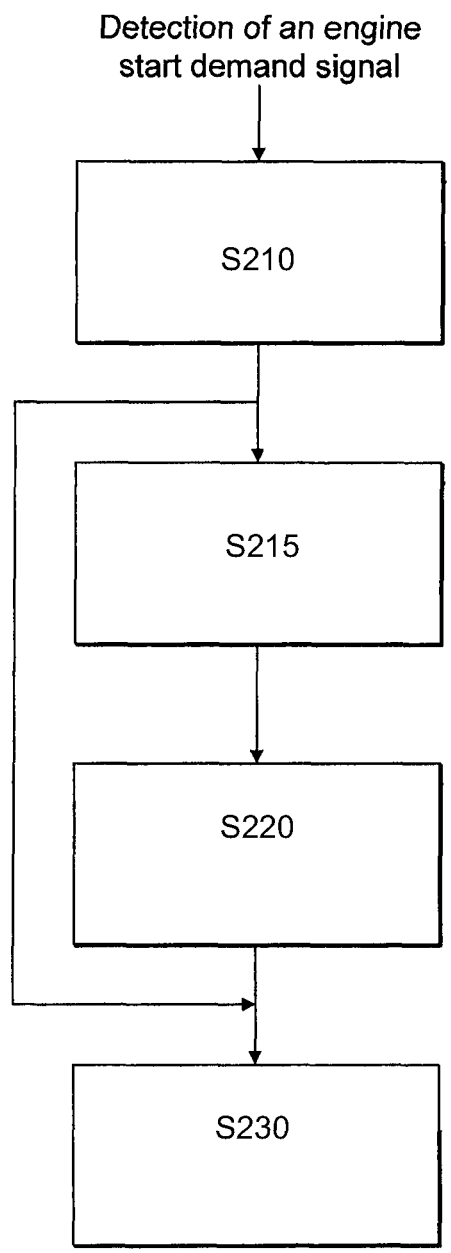
FIG. 4 shows method steps for starting an engine arrangement of the type shown in FIG. 3.

FIG. 4 shows a flow diagram of a method of controlling the starting of the engine arrangement shown in FIG. 3. The method steps shown in FIG. 4 are similar to those shown in FIG. 2, and vary only in the provision of an additional step, S220.

When the measured parameters are such that it is determined that there may be engine 10 starting difficulties, after the particulate filter 60 heating is turned on and the recirculation valve 70 opened (Step S215), the ETA device 24 may be turned on in Step S220 in order to rotate the compressor 26 of the turbocharger 20.

Alternatively, the particulate filter 60 may be heated and the recirculation valve 70 opened after the ETA device 24 is turned on in Step S220 and before the engine is turned on in Step 230.

By rotating the compressor 26 to a speed which allows a calibrated flow of air into the air intake manifold of the engine 10, the air pressure in the air intake manifold may be increased. The warmed, recirculated residual air may be recirculated into the intake of the compressor 26 (as shown in FIG. 3) so that the air at the air intake manifold of the engine 10 may be both warmed and at a higher pressure.

When the ETA device 24 has been on for a sufficient period of time to increase the air pressure in the air intake manifold to a sufficient level above the ambient air pressure, (for example, at sea level, an air pressure of 1.2 bar in the air intake manifold may be considered to be sufficient, which might take up to approximately 10 seconds to achieve after turning on the ETA device 24) and the particulate filter 60 has been heated to a desired temperature for a sufficient period of time to warm the residual air to a desired temperature (as explained above), the engine 10 may be started (Step S230). In any event, the engine 10 may be started after a predetermined extended period of time (as explained above), even if the air pressure in the air intake manifold has not reached a sufficient level, for self-protection of the arrangement.

By increasing both the temperature and the pressure of the air in the air intake manifold of the engine 10 before turning on the engine 10, combusting the fuel injected into the engine 10 when the engine 10 is started (S230) may be eased even further.

After starting the engine 10, the ETA device 24 may stop driving the turbo shaft and switch to normal operation when the engine 10 is considered to be operating within an acceptable operating range. The engine 10 may be considered to be operating within an acceptable operating range when the engine exceeds a performance threshold, for example when the engine temperature exceeds a threshold value, such as 40° C. or 45° C., or when the engine speed exceeds a threshold value, such as 300 rev/min. In any event, the engine 10 may be returned to normal operating conditions upon expiry of the predetermined extended period of time (which is explained above).

FIG. 1 shows a controller 40 in accordance with an aspect of the present disclosure.

The controller 40 may have a number of inputs, including, but not exclusive to: the measured parameters, air temperature $T_A$, engine coolant temperature 41, altitude 42, and fuel temperature 44; engine speed 43; and the engine start demand signal 45. The controller may also have a number of outputs, including, but not exclusive to: the recirculation valve control signal 46 and a filter heating signal 47.

FIG. 3 shows a controller 40 in accordance with a further aspect of the present disclosure. The controller 40 shown in FIG. 3 is the same as that shown in FIG. 1, but includes a further output: the ETA control signal 48.

The controller 40 is arranged to carry out the above described methods upon receipt of an engine start demand signal 45. The controller 40 may utilise an engine map or table, or some other suitable means, in order to determine whether or not the engine 10 should be directly started as normal, or if method steps should be taken to ease engine starting. The controller 40 may also utilise other engine maps or tables to determine the other threshold values described above in respect of the method steps for easing engine starting.

The controller 40 may be implemented in an engine control unit, for example the Caterpillar® A4:E4 or A5:E2, or as a separate, standalone control unit.

Figure 5:
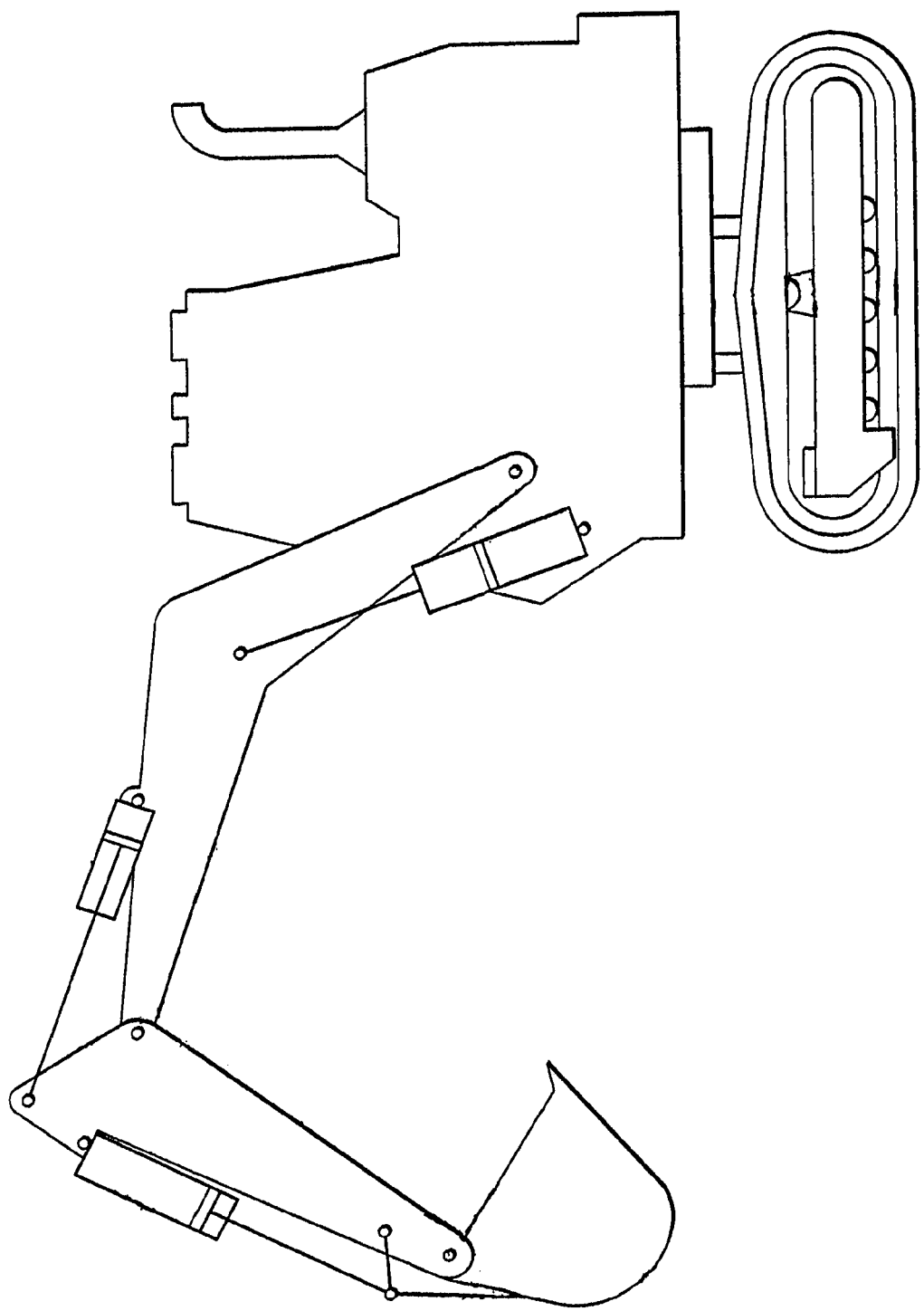
FIG. 5 shows an example vehicle within which the engine unit of FIG. 1 or 3 may be used.

FIG. 5 shows a vehicle within which the engine unit shown in FIG. 1, or the engine unit shown in FIG. 3, could be used.

The skilled person will appreciate that various alternatives to the aspects of the implementations described above may be used. For example, rather than using a turbocharged internal combustion engine with a turbocharger 20 with an ETA device 24, any other type of forced induction internal combustion engine, for example a supercharged international combustion engine, with a forced induction compressor arranged to increase the pressure of the air entering the air intake manifold of the engine, for example a supercharger, coupled to a compressor assist device (of which an ETA device is an example) that is arranged to drive the forced induction compressor, thereby compressing intake air, independently of engine operation could alternatively be used.

INDUSTRIAL APPLICABILITY

The present disclosure finds application in starting internal combustion engines. In some conditions, for example at low ambient air temperatures and/or high altitudes, starting internal combustion engines may be difficult. In the present disclosure, heating an exhaust gas aftertreatment device associated with the internal combustion engine may increase the temperature of the air recirculated to the air intake manifold of the engine before starting the engine, which may make combusting the fuel injected into the engine when the engine is started easier, and, therefore, make starting the engine easier. Furthermore, by heating the exhaust gas aftertreatment device before starting the engine, the engine temperature may also be brought up to operating temperature more quickly after it is started because the temperature of all exhaust gases, from the moment the engine is turned on, may be increased before being recirculated to the engine air inlet, which may increase the temperature of the air being drawn into the engine 10, thereby increasing the engine temperature.

The invention claimed is:

1. A method for starting an internal combustion engine which has an exhaust system comprising
an exhaust gas path,
an exhaust gas aftertreatment device which is in the exhaust gas path,
a heat release device disposed within the exhaust gas aftertreatment device, and
an exhaust gas recirculation path such that, when the engine is turned on, exhaust gas may exit the engine into the exhaust gas path and at least a part of the exhaust gas which has passed through the exhaust gas aftertreatment device may be recirculated to an engine air intake via the exhaust gas recirculation path,
wherein the engine is a forced induction internal combustion engine which has a compressor assist device,
the method comprising:
when engine start is demanded, determining from at least one measured parameter whether engine start difficulty is expected;
if engine start difficulty is expected,
transferring energy from an energy storage device to the heat release device,
converting the energy to heat within the exhaust gas aftertreatment device via the heat release device,
transferring the heat to a residual air within the exhaust gas system, thereby generating a warmed residual air within the exhaust gas system, and
turning on the compressor assist device to drive a forced induction compressor before starting the engine, thereby increasing an engine air intake pressure; and
starting the engine after the converting the energy to heat within the exhaust gas aftertreatment device and after the turning on the compressor assist device.

2. The method of claim 1, wherein the exhaust system further comprises a recirculation valve in the exhaust gas recirculation path,
the method further comprising:
opening the recirculation valve before starting the engine; and
closing the recirculation valve to prevent warmed exhaust gases from recirculating to the engine air intake when the engine exceeds a first predetermined performance threshold, or when the exhaust gas aftertreatment device has been heated for a period of time exceeding a first predetermined period of time.

3. The method of claim 2, further comprising returning the compressor assist device to normal operation when the engine exceeds a second predetermined performance threshold, or when the forced induction device has been on for a period of time exceeding a second predetermined period of time.

4. The method of claim 1, wherein the warmed residual air is recirculated to a point upstream of the forced induction compressor such that the warmed residual air is compressed by the forced induction compressor before entering the engine air intake.

5. The method of claim 1, wherein the at least one measured parameter comprises at least one of an ambient air temperature, an engine altitude, an engine coolant temperature, and a fuel temperature.

6. The method of claim 1, wherein the turning on the compressor assist device occurs after the converting the energy to heat within the exhaust gas aftertreatment device.

7. A controller for starting an internal combustion engine which has an exhaust system comprising
an exhaust gas path,
an exhaust gas aftertreatment device which is in the exhaust gas path,
a heat release device disposed within the exhaust gas aftertreatment device, and
an exhaust gas recirculation path such that, when the engine is turned on, exhaust gas may exit the engine into the exhaust gas path and at least a part of the exhaust gas which has passed through the exhaust gas aftertreatment device may be recirculated to an engine air intake via the exhaust gas recirculation path,
wherein the engine is a forced induction internal combustion engine which has a compressor assist device,
the controller being configured to:
when engine start is demanded, determine from at least one measured parameter whether engine start difficulty is expected;
if engine start difficulty is expected,
transfer energy from an energy storage device to the heat release device,
convert the energy to heat within the exhaust gas aftertreatment device via the heat release device,
transfer the heat to a residual air within the exhaust gas system, thereby generating a warmed residual air within the exhaust gas system, and
turn on the compressor assist device to drive a forced induction compressor before starting the engine, thereby increasing an engine air intake pressure; and
start the engine after converting the energy to heat within the exhaust gas aftertreatment device and after turning on the compressor assist device.

8. The controller of claim 7, wherein the exhaust system further comprises a recirculation valve in the exhaust gas recirculation path,
the controller being further configured to:
open the recirculation valve before starting the engine; and
close the recirculation valve to prevent warmed exhaust gases from recirculating to the engine air intake when the engine exceeds a first predetermined performance threshold, or when the exhaust gas aftertreatment device has been heated for a period of time exceeding a first predetermined period of time.

9. The controller of claim 8, wherein the at least one measured parameter comprises at least one of an ambient air temperature, an engine altitude, an engine coolant temperature, and a fuel temperature.

10. The controller of claim 7, wherein the controller is further configured to return the compressor assist device to normal operation when the engine exceeds a second predetermined performance threshold, or when the compressor assist device has been on for a period of time exceeding a second predetermined period of time.

11. The controller of claim 7, wherein the at least one measured parameter comprises at least one of an ambient air temperature, an engine altitude, an engine coolant temperature, and a fuel temperature.

12. The controller of claim 7, wherein the controller is part of an Engine Control Unit.

13. An internal combustion engine comprising the controller defined in claim 7.

14. A vehicle comprising the internal combustion engine defined in claim 13.

15. The controller of claim 7, wherein turning on the compressor assist device occurs after converting the energy to heat within the exhaust gas aftertreatment device.

* * * * *